United States Patent [19]

Hogan et al.

[11] Patent Number: 5,373,485
[45] Date of Patent: Dec. 13, 1994

[54] METHOD FOR LOCATING DATA IN A DATA CARTRIDGE SYSTEM

[75] Inventors: Michael A. Hogan, Shoreview; George W. Blattner, Oakdale; Charles R. Kummeth, Lake Elmo; Alan R. Olson, Cottage Grove, all of Minn.

[73] Assignee: Minnesota Mining and Manufacturing Company, St. Paul, Minn.

[21] Appl. No.: 753,808

[22] Filed: Sep. 3, 1991

[51] Int. Cl.$^5$ .......................... G11B 7/00; G11B 15/18
[52] U.S. Cl. .................................... 369/32; 369/44.28; 360/78.02; 360/72.2
[58] Field of Search ............... 360/72.2, 74.1, 78.02, 360/53, 72.1, 77.02, 77.01, 77.06, 78.02; 369/32, 48, 44.28, 44.26

[56] References Cited

U.S. PATENT DOCUMENTS

| | | | |
|---|---|---|---|
| 3,692,255 | 9/1972 | Von Behren | 242/192 |
| 4,393,445 | 7/1983 | Milligan et al. | 360/72.2 |
| 4,716,558 | 12/1987 | Katayama et al. | 360/72.2 |
| 4,774,699 | 9/1988 | Giddings | 360/72.2 |
| 4,858,039 | 8/1989 | Mintzlaff | 360/72.2 |

FOREIGN PATENT DOCUMENTS 1-171185 7/1989 Japan.

OTHER PUBLICATIONS

Patent Abstracts of Japan, vol. 14, No. 574, p. 1145, Dec. 20, 1990, & JP 2-246075.
Patent Abstracts of Japan, vol. 13, No. 443, p. 941 Oct. 5, 1989, & JP 1-171185.
"½-Inc. Tape Cartridges Provide More Capacity for Disk Drive Backup," Morris, *Computer Technology Review*, vol. IV, No. 2, Mar. 1986, Los Angeles, Calif.

Primary Examiner—W. R. Young
Assistant Examiner—Nabil Hindi
Attorney, Agent, or Firm—Gary L. Griswold; Walter N. Kirn; Charles L. Dennis, II

[57] ABSTRACT

A physical and logical block search method and apparatus that also locates the end of data on a data tape written in a serpentine pattern. A physical address is decoded to determine the track location and physical block address of a physical block on a serpentine data pattern written on a data cartridge tape. The tape is manipulated in the forward and reverse direction depending on the location of the beginning of data on the track. The search algorithm exploits serpentine nature of the tape and the location of the physical blocks in each track to find the physical address. The logical address of a logical block is used to determine a target track number. A prediction is made as to the location of the target track. The prediction is verified by checking the block. If the logical block was not accurately predicted the method repredicts until the logical block is found. The end of tape is located using a binary search based on knowledge of the track assignment of the serpentine data pattern on the tape.

6 Claims, 7 Drawing Sheets

METHOD FOR LOCATING DATA IN A DATA CARTRIDGE SYSTEM

This patent relates to a method and apparatus for locating data on a data tape and more particularly, to a data search algorithm for searching for a logical block, a physical block, or the end of data on a data tape.

BACKGROUND OF THE INVENTION

This invention relates to magnetic tape recorders and preformatted tapes adapted for use therein, and in particular, to such recorders adapted for data recording purposes utilizing magnetic recording tapes preloaded in data cartridges. Data recording cartridges and recorders adapted for their use are notably disclosed and claimed in U.S. Pat. No. 3,692,225 (Von Behren). In the cartridge there disclosed a magnetic recording tape is preloaded in a reel-to-reel type enclosure together with an endless flexible belt in frictional contact with the tape on both reel hubs for incrementally bidirectionally driving the tape, including rapid accelerations and decelerations, such as are encountered in digital data recording and playback. The system there set forth represents many advantages such that data cartridges are filling an important need in the computer industry, especially as backup storage for mini-computer and microprocessor based systems. Such tapes are typically written and read using a redetermined format. The format is based on a physical and logical block structure. The tape is usually divided up into tracks and each track contains a number of physical blocks. These blocks are of a predetermined size and contain various types of information related to the structure and content of the block as well as the data that comprises the block. The track and physical block structure is further organized as logical blocks which are conceptualized in a hierarchical fashion. Each logical block is composed of a number of physical blocks. The number of physical blocks in a logical block varies depending on the application of the tape drive. In a preferred embodiment particularly pertinent to the present invention there are a number of tracks on each tape and each track has a variable number of physical blocks and further the logical block cannot span more than one track. Those skilled in the art will appreciate that the methods of the current invention are equally applicable to situations where logical blocks span multiple tracks as well as in the situation where logical blocks span a number of tapes.

Figure 1:
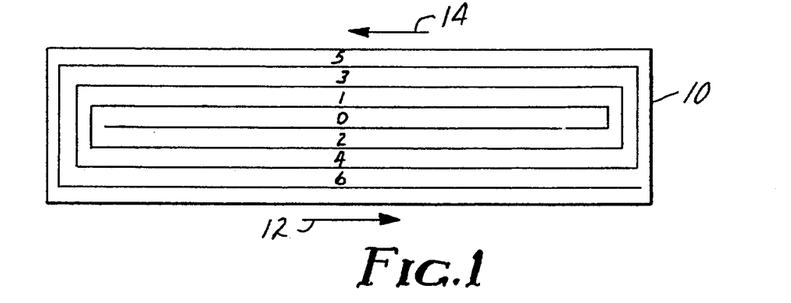
FIG. 1 is a schematic diagram of a data tape written in a serpentine fashion.

Referring now to FIG. 1 which shows such a recording tape 10 written in a serpentine fashion. The tape 10 is of arbitrary length and contains a plurality of tracks. Tape 10 is shown as having seven tracks in this embodiment of the invention. The writing of information on the tape occurs in a serpentine fashion whereby the tape is read and written by a single read, write head combination which reads the tape in a forward direction indicated by arrow 12 and in a backwards direction indicated by arrow 14. The serpentine tape 10 of FIG. 1 has seven tracks written from the center track 0 to the outer-most track 6. Track 0 is written in the forward direction, track 1 is written in reverse direction, track 2 is written in the forward direction, track 3 is written in the reverse direction, track 4 is written in the forward direction, track 5 is written in the reverse direction and finally track 6 is written in the forward direction. Those skilled in the art will appreciate that the serpentine format may contain a predetermined number of tracks which is determined by the physical characteristics and dimensions of the tape and the tape reading/writing mechanism. Those skilled in the art will appreciate that the serpentine format is advantageously employed to void the necessity of formatting the tape.

The serpentine format avoids the necessity of formatting the tape by providing a tape header on certain tracks. In this referred embodiment of the invention the tape header appears on even tracks. Those skilled in the art will appreciate that the tape header could occur on all tracks. The elimination of the need to format a tape prior to the reading or writing of data saves the time required to run the tape from the beginning of the first track to the end of the last track.

SUMMARY OF THE INVENTION

The invention provides a way of locating a logical and physical block and the end of data on a data tape. One embodiment of the invention utilizes a physical block address which can be alternately provide by an external computer or a peripheral controller. The method of the invention exploits the nature of a serpentine-written tape to search for the location of a physical block by stepping to a predetermined track and rewinding the tape to the beginning of the tape and reading until the block is found. The invention provides a method of locating a logical block on a tape by knowing the current track number, the target logical block number and the target logical block header. The method of finding the logical block uses a predicted track number as a starting point for a search for a target track. If the method of the invention does not locate the target logical block after an iteration, a new prediction is created based on the track found. The method of the invention additionally provides a way of finding the end of data on a data tape by using a binary search of the serpentine tracks. A 'End of data' signal is written in the track header of each track that does not contain data and following the last valid block of data. The method and apparatus of the invention continuously searches the tape based on a binary search algorithm until the first "end of data" signal is found.

Other features and advantages of the present invention will become apparent to those skilled in the art through the Description of the Preferred Embodiment, Claims, and Drawings herein wherein like numerals refer to like elements.

BRIEF DESCRIPTION OF THE DRAWINGS

To illustrate the invention, a preferred embodiment of this invention will be described hereinafter with reference to the accompanying drawings.

DESCRIPTION OF THE PREFERRED EMBODIMENT

Figure 2:
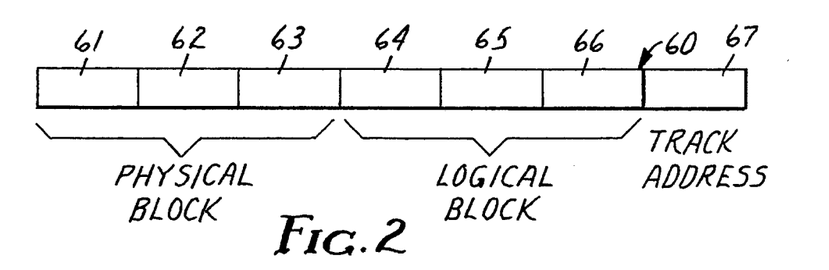
FIG. 2 is a schematic representation of the logical block header used in the method and apparatus of the invention showing the physical and logical block portions.

Now referring to FIG. 2 which shows a schematic representation of a block header used in practicing the method of the invention. The tape is composed of a plurality of physical blocks which are grouped into a number of logical blocks. Each physical block has a block header. The number of physical blocks and logical blocks that are the subject of the search in the tape search algorithm method of the invention do not need to be predetermined before the method is implemented. The block header 60 comprises seven bytes 61 through 67 grouped as two groups of three bytes and a track byte 67. The first three bytes are considered the physical record number of the block, the next three bytes are considered the logical record number of the block. Bytes 61, 62 and 63 compose the physical block information and are encoded to yield the actual physical block number of this particular block. The next three bytes 64, 65 and 66 include the logical block information and are encoded to indicate the logical block wherein this physical block is a member. The track byte 67 contains the track number.

Figure 3:
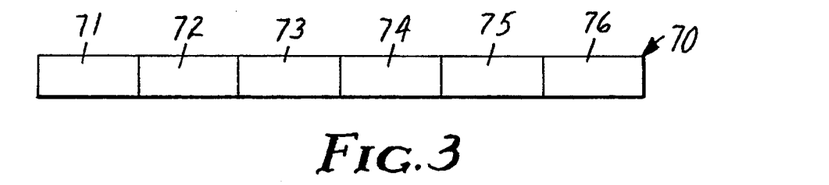
FIG. 3 is a schematic block diagram of the data tape showing a logical block composed of six physical blocks.

FIG. 3 illustrates the structure of a logical block which is composed of a number of physical blocks 71, 72, 73, 74, 75 and 76. Each physical block has a physical block header as described hereinabove with reference to FIG. 2.

Figure 4A:
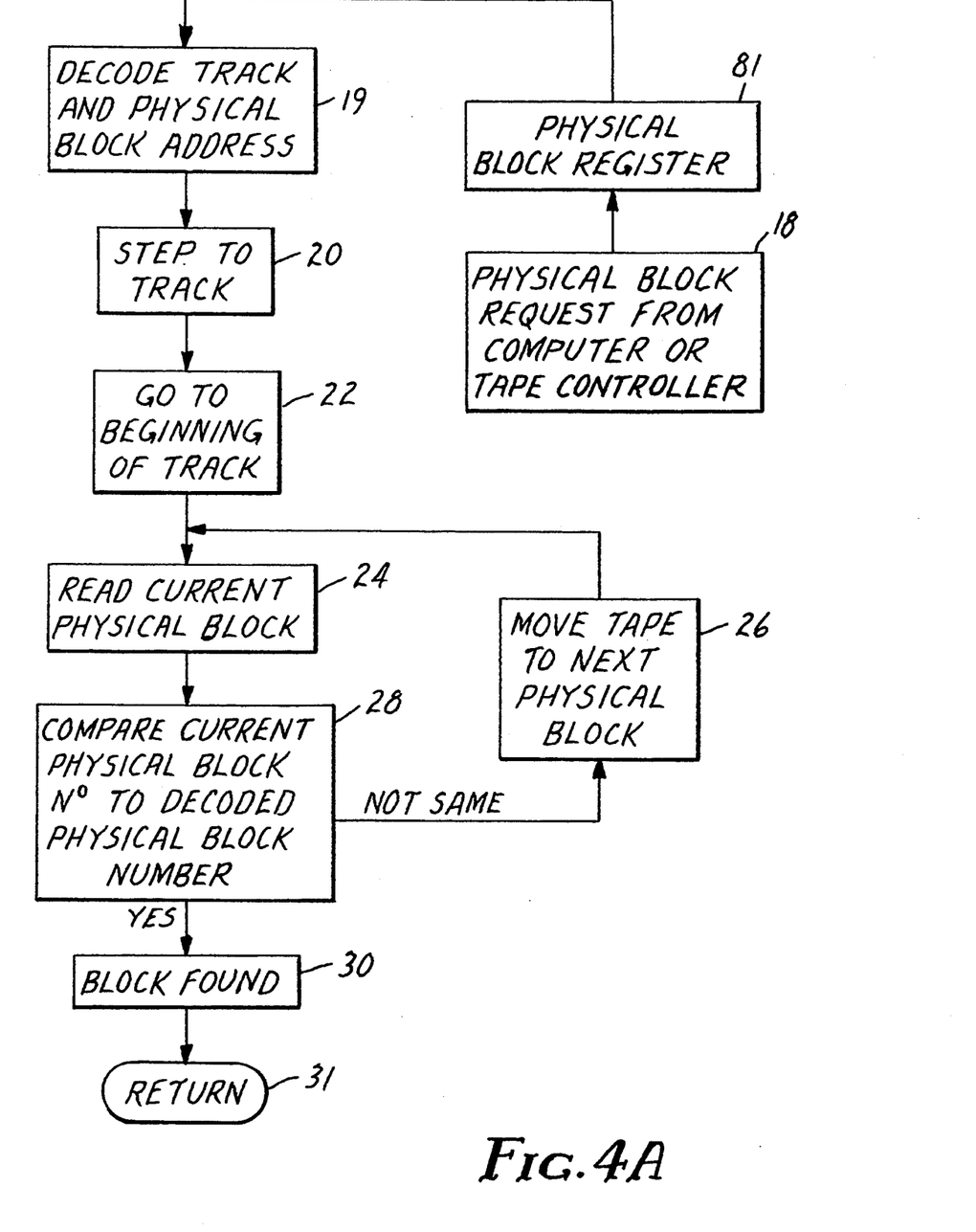
FIG. 4A is a schematic block diagram of the method of finding a physical block from a physical block address.

Now referring to FIG. 4A wherein a schematic process block diagram of the method of the invention used to find a physical block is shown. When a higher level device such as a computer or tape controller accesses a tape drive peripheral the device may request information from the peripheral in a number of ways. In a tape drive system the processor or controller may request information using a track number, a physical block address or a logical block address. The processor or controller may also request that the tape go to the end of the data on the tape. In the method and apparatus of the tape searching algorithm of the invention, the algorithms of the invention all exploit the serpentine nature of the tape structure to achieve improved performance. The structure of the physical blocks and logical blocks on each track are considered in making the logical steps required to find certain physical or logical block locations.

Figure 7:
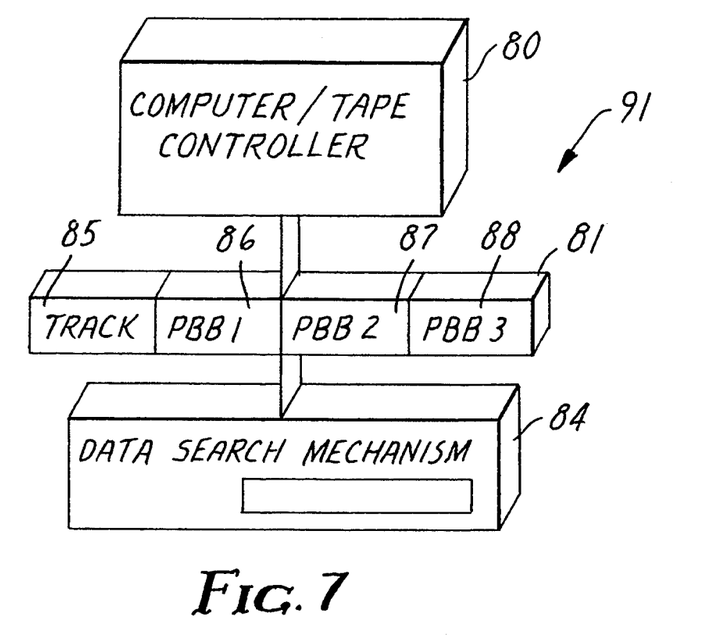
FIG. 7 is a schematic block diagram of the method and apparatus of the invention used to find the physical block knowing a physical block address.

FIG. 4A is a schematic diagram of the method of locating a physical block when the processor or controller knows the physical block address and the track number of the location of the physical block address. In this embodiment of the invention, the processor or controller in the system requests that the physical block at a certain track number be located. A physical block address register 81 is shown in FIG. 7. Byte one 85 contains a track number and byte two 86, byte three 87 and byte four 88 are physical block address bytes which correspond to the track number and physical block address description of FIG. 2.

Now referring again to FIG. 4A which describes a schematic diagram of the method of finding a physical block when the track number and block address are known. The method of the invention starts by accepting a physical block search request 18 from a host computer or tape controller. Next, the host computer or tape controller loads a physical block register 81 with the track and physical block address. In process step 19 the physical block record is decoded and a track and physical block number is determined. The process then flows to step 20 where the head is stepped to the track decoded in the physical block record. Stepping to a track implies that the read/write tape head is positioned over the track. Those skilled the in art will appreciate that there are a number of ways of stepping a read/write tape head to a track and that alternate and various methods could be used to step to a particular track without departing from the scope of the invention. After the tape is stepped to the decoded track the process flows to block 22 where the tape is rewound to the beginning of the located track.

In one embodiment of the present invention, the serpentine pattern may be the serpentine pattern found in FIG. 1. The beginning of all odd tracks would be in the forward direction 12. The beginning of the even tracks would be in the reverse direction 14.

Continuing with the process of FIG. 4A, the process then flows to process step 24 where each physical block in the track is read from the beginning of the track in sequence. The process then flows to process step 28 where the physical block address decoded from the physical block record is compared against the current block address. If the current block address is equal to the decoded physical block address then the decoded block address is found and the process flows to the 'physical block found' step 30. If the comparison fails then the process flows to process step 26 where the tape is moved to position the tape so as to read the next sequential physical block.

Those skilled in the art will recognize that in the process diagram of FIG. 4A the read/write tape head will be residing in a current track. If the current track is the same as the track number decoded from the physical block register then the tape head is not moved to a new track.

The advantages of the block searching scheme of FIG. 4A include the elimination of the search time associated with scanning any of the other tracks not indicated by the physical block record. Those skilled in the art will recognize that the algorithm disclosed in FIG. 4A could be advantageously used with a variable block size, that is, a block size that varies from block to block. A further advantage of the invention is that the algorithm does not require that a predetermined number of blocks exist in a track or that a predetermined number of bytes are in any one block.

Figure 4B:
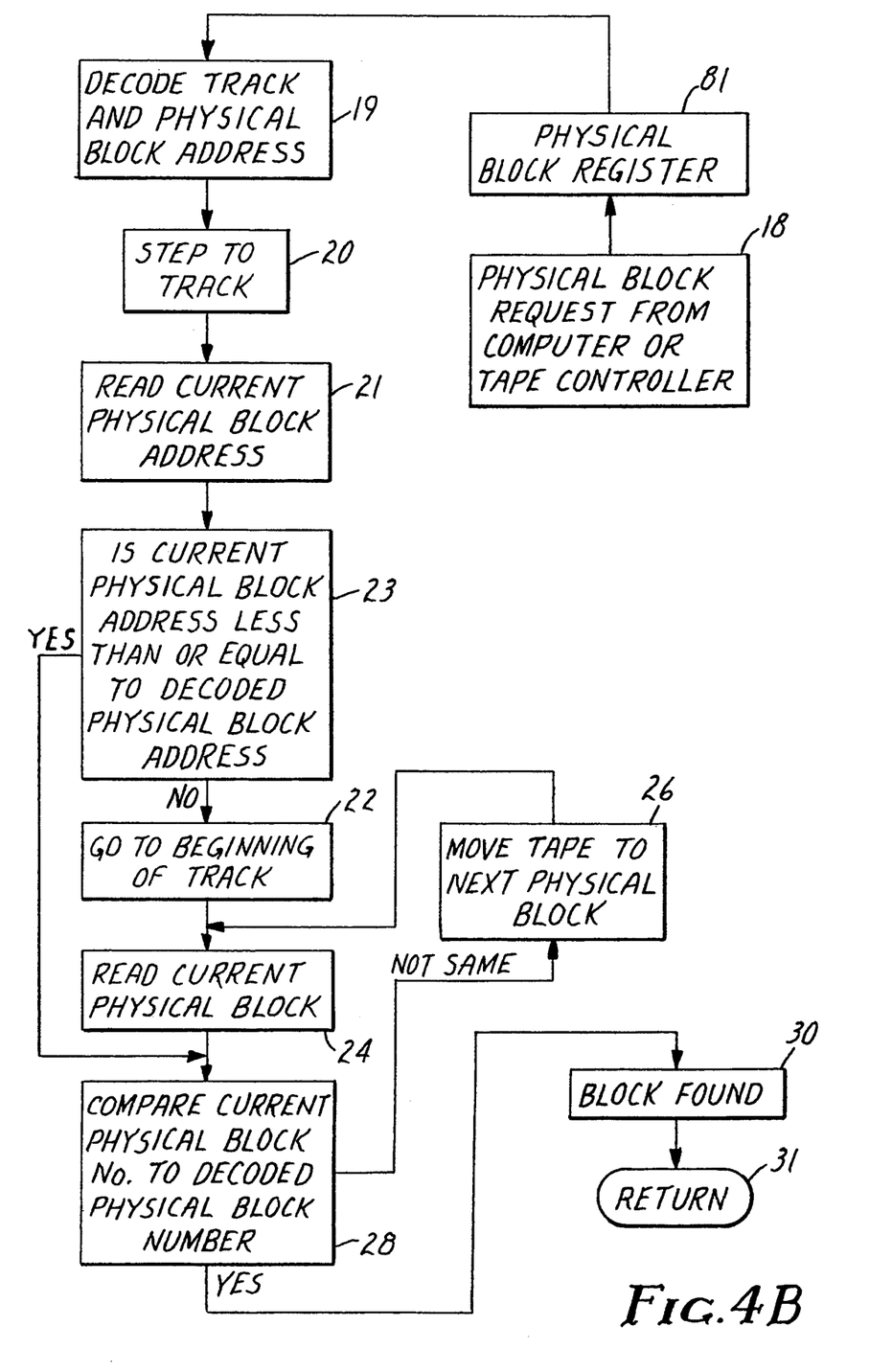
FIG. 4B is a schematic block diagram of an alternate method of finding a physical block from a physical block address.

Now referring to FIG. 4B, an alternate embodiment of the method of finding a physical block knowing the decoded track and physical block address is shown. In the method and apparatus of FIG. 4B the serpentine tracks are assumed to have physical block addresses that either increase or decrease as the tape is read in the forward direction or the reverse direction. If the tape is so written then the method of FIG. 4A can be improved by inserting two more steps in the method. The first additional step 21 reads the current physical block address after the head is stepped to a decoded track in process step 20. This provides a mechanism by which the current physical block address can be determined at the location of the head position without requiring the tape to move a substantial amount. The next additional step 23 determines whether the current physical block address is less than or equal to the decoded physical block address. Step 23 tries to determine whether or not, by simply reading forward, the physical block address can be found. If the condition described in process step 23 is true then the process steps to process block 28 where the current physical block address is compared to the decoded physical block address. This avoids the process step 22 of repositioning to the beginning of the track. Repositioning may take a substantial amount of time if the tape is not close to the beginning of the track.

Those skilled in the art will recognize that the process can be reversed depending on the direction of increasing or decreasing physical block addresses and the beginning location of each track. Those skilled in the art will also recognize that further speed improvements can be obtained by performing a binary search instead of merely going to the beginning of the track at process step 22.

The advantages of the physical block searching scheme of FIG. 4B exploit the serpentine nature of the tape to avoid or eliminate the searching of any of the other tracks not indicated by the physical block record. Those skilled in the art will recognize hat the algorithm disclosed in FIG. 4B could be used with a variable block size from block to block and that the algorithm does not depend on any number of predetermined blocks to reside in a track. Further, it does not require a predetermined number of bytes to be contained in any one physical block.

Figure 5:
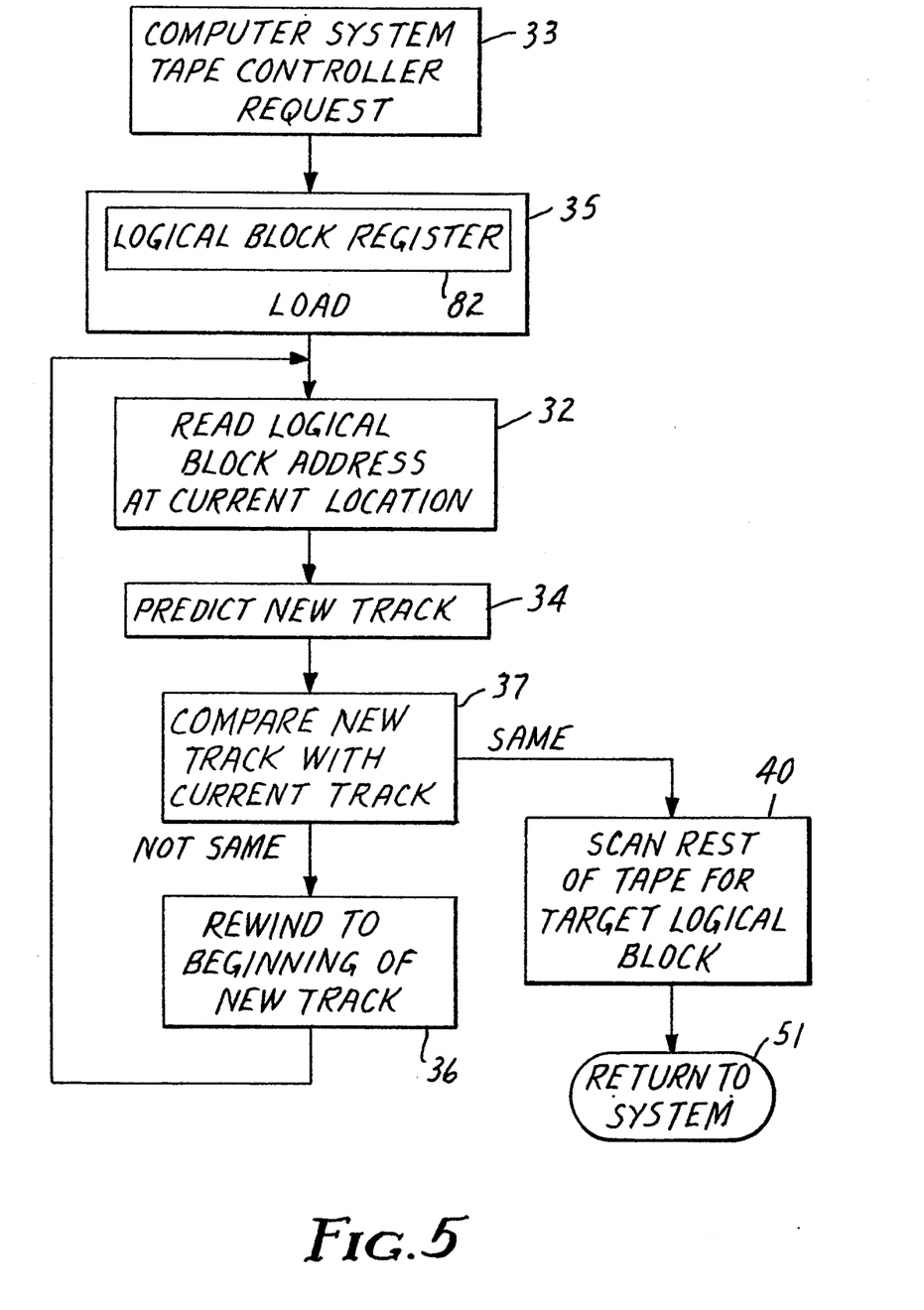
FIG. 5 is a schematic of the method of determining the location of a logical block.

Now referring to FIG. 5 wherein the process of locating a physical block knowing the logical block address is described. FIG. 5 shows a schematic block diagram of the method of searching for a logical block composed of physical blocks. The logical block address that is to be found is sent by the computer system or tape controller commanding the tape drive. The method of searching for a logical block knowing the logical block address first begins with a request from the computer or controller to find logical block, shown in process step 33. The logical block address is contained in logical block register 82. The process then flows to block 35 where the logical block register 82 is loaded with the logical block address. The method of the invention to search for logical blocks next proceeds by decoding the logical block address of the physical block at the current position of the tape.

The method and apparatus of searching for a logical block is now ready to use a prediction scheme whereby the logical block's corresponding physical blocks are found with an iterative scheme. The process in FIG. 5 continues with block 32 where the logical block address found in the physical block record of the tape is read from the current position of the tape. The process then flows to the block 34 where the new track number that corresponds to the location of the logical block is predicted according to Equation 1:

$$\frac{\text{CURRENT TRACK NUMBER}}{\text{LOGICAL BLOCK NUMBER}} \times \quad (1)$$

-continued (TARGET LOGICAL BLOCK ADDRESS $-1$) $=$

PREDICTED TRACK NUMBER

The current track number, which is assumed to be known, is divided by the current logical block number read from the current location. The quotient is multiplied by the target logical block address.

Equation 1 suffers from a deficiency when the track number for the current track is zero in which case equation 2 is used to predict the new track number. Equation 2:

$$\frac{\text{ESTIMATED LOGICAL BLOCK LENGTH}}{\text{BITS PER TRACK}} \times \quad (2)$$

TARGET LOGICAL BLOCK ADDRESS $-1 =$

NEW TRACK NUMBER

The estimated logical block length which is in number of bits, is divided by the data bits per track to determine an estimate of the quotient formed in Equation 1 of the current track number divided by the logical block number.

The process then flows to process step 37 where a check is made to determine if the predicted new track is equal to the current track that the head is currently positioned on. If so the process flows to block 40 where the rest of the tape is scanned for the target logical block. If the target logical block is found the process flows to block 51 and returns to the requester. If the target logical block is not found the process returns an error condition. If the predicted track is not equal to the current track the process flows to block 36 where the tape is rewound to the beginning of the predicted track calculated in block 34. The process then advances to block 33 where the block record is again read at the beginning of the track. Both the logical and physical block address for this block is found at this point in the tape as shown in FIG. 2. The process then flows to process step 32 and the method repeats until the predicted track is found. The process ends in all cases in block 50 where the tape is positioned for a read or a write.

To summarize FIG. 5, the logical block searching method and apparatus of the invention provides a way of looking for the physical block address knowing the logical block address. The method and apparats of the invention exploits the serpentine nature of the data written on the tape. Those skilled in the art will recognize that the preferred embodiment of the invention utilizes a scheme whereby each logical block is completely contained within a track.

Figure 6A:
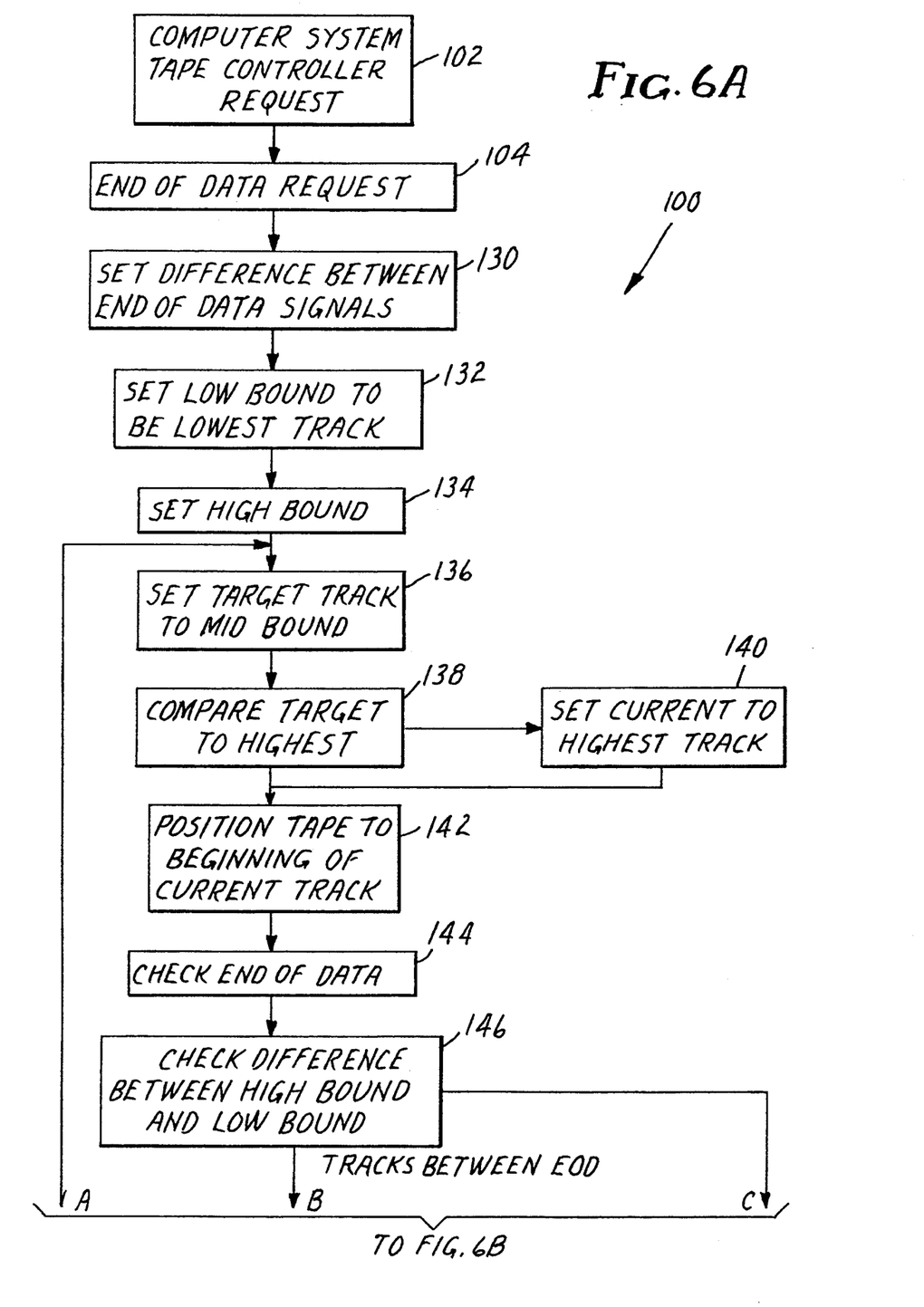
FIGS. 6A and 6B show a method of determining the position of end of tape on a data tape with the method of the invention.
Figure 6B:
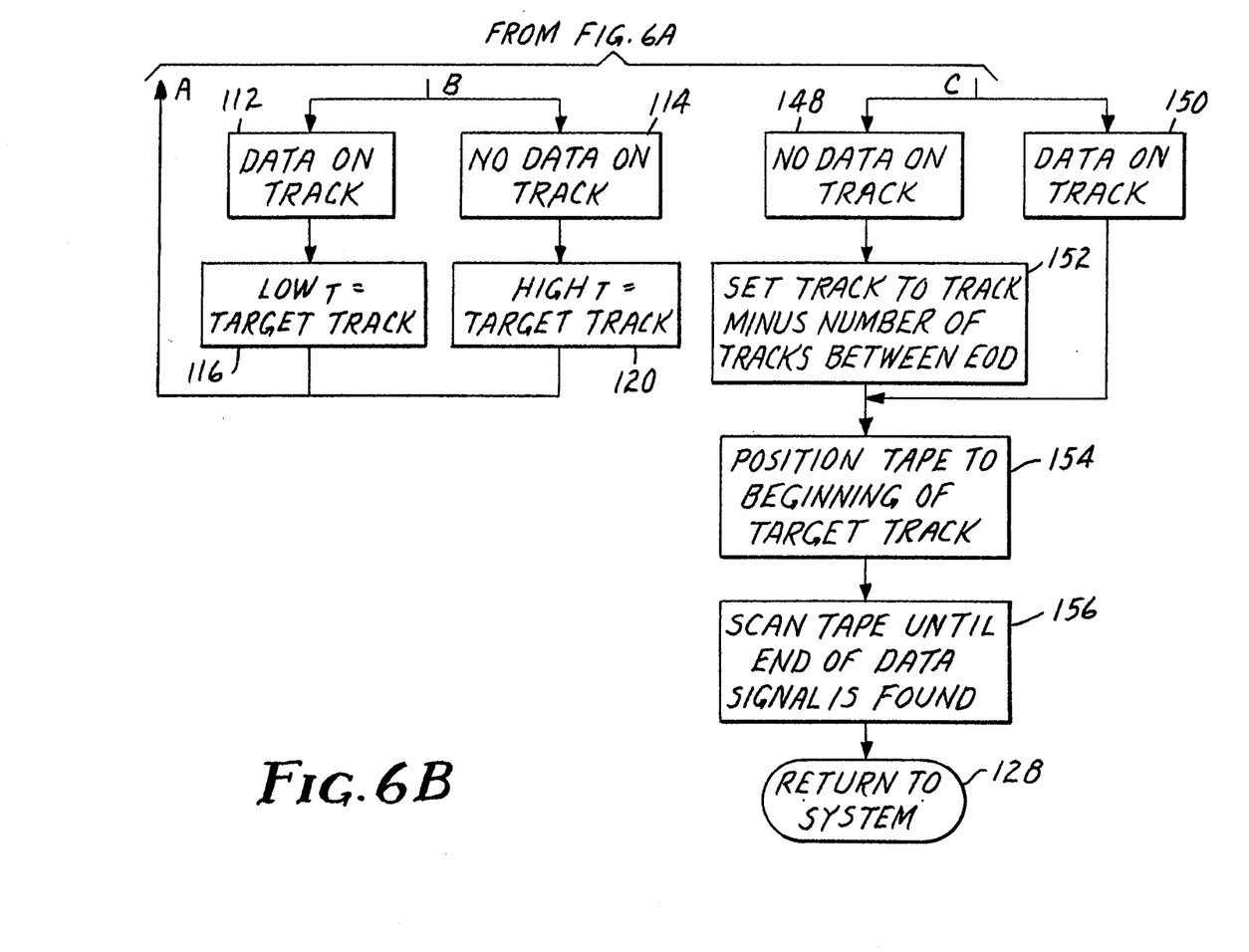

FIGS. 6A and 6B show a schematic drawn to the method and apparatus of locating the end of data on the tape represented as a schematic flow diagram 100. In the serpentine pattern of a tape depicted in FIG. 1 the tracks that do not contain valid data have an end of data marker encoded upon them. The method and apparatus of the invention used to find the end of data on the tape exploits the serpentine nature of the tape and a binary search method.

In the method of this embodiment the computer system or controller 102 requests an end of data seek operation 104. After the computer system or controller 102 requests a 'end of data' seek operation 104 the process flows to block 130 to set the difference in number of tracks between 'end of data' signals equal to the difference in tracks between tracks on the serpentine tape with an end of data signal in their track headers. This step 130 provides a method of utilizing the method of the invention regardless of the distribution of serpentine tracks with an 'end of data' signal headers encoded in them. In this preferred embodiment of the invention 'end of data' signals exist on all even tracks. All even tracks have track headers which are at the beginning of the tape.

In the method of FIGS. 6A and 6B, the target track is distinguished from the current track to avoid nonexistent tracks and to maintain a place holder for the binary search.

The process then flows to process block 132 where the low bound is set to the lowest track number. The low bound is a state variable which is used to indicate the lowest bound of the search. The process then flows to 134 where the high bound is set to the next higher power of two greater than or equal to the lowest track plus the difference between the highest and lowest track. This step 134 is included to assure that integer tracks are used to set the target track number. The high bound state variable indicates to the search method the highest track to attempt to examine. The process then flows to 136 where the target track is set to be the low bound plus the difference between the high bound and the low bound divided by two. Those skilled in the art will appreciate that since the higher bound is set to a power of two greater than or equal to the lowest track plus the difference between the highest and lowest track the above division will result in an integer. The target track is the track of interest at this point in the method of the invention and indicates at which track the 'end of data' marker will be checked for at the header. The process then flows to process block 138 where the target track is compared to the highest track. If the target track is greater than the highest track the current track is set to the highest track 140 if not the current track is set to the target track. This is to avoid checking nonexistent tracks. The process then flows to process block 142 where the tape is positioned to the beginning of the current track. The process then flows to 144 where 'end of data' is checked. The process then flows to 146 where the difference between the highest bound and the lowest bound is checked against the number of tracks between 'end of the data' signals. If the difference between the high bound and the low bound is less than or equal to the number of tracks between end of the data signals and the 'end of the data' signal is at the beginning of the current track the process flows to process block 148. This condition indicates no data is on the current track. The process then flows to 152 where the current track is reset to the current track minus the number of tracks between the end of the data signals to assure that the tape is positioned to capture the 'end of the data' signal. The process then flows to 154 where the tape is positioned to the beginning of the current track. The process then flows to 156 where the current track is scanned until the 'end of the data' signal is found in the current track.

If the result of the comparison in process block 146 is such that the difference between the high bound and the low bound is less than or equal to the number of tracks between the end of the data signals and the current track contains valid data, indicated by process block 150, the process then flows immediately to process block 154 where the tape is positioned to the beginning of the current track and the process flows to 156 where the tape is scanned until the end of the data signal is found.

In the case where the check for the difference between the high bound and the low bound 146 is greater than the difference in tracks between 'end of the data' signals the process flows to either block 112 or 114. Block 112 indicates the state where data is found on the current track. In this case the process flows to 116 where the lower bound is set to the target track and the process flows back to process block 136 where the target track is set to the midpoint of the rack bounds. In the case where the difference between the high bound and the low bound is greater than the number of tracks between 'end of the data' signs and there is no data on the current track the process flows to process block 114 where the case is handled for the occurrence of 'end of the data' at the head of the current track. The process then flows to process block 120 where the high bound is set to be the target track. The process then flows to 136 as in process block 116. At 136 the target track is set to be the midpoint in the track bounds. In all cases the process ends at process step 128 where the algorithm of the invention returns control to the computer system or tape controller.

Those skilled in the art will appreciate that the method of determining the end of the data marker on the tape can be improved from a performance standpoint in the special cases where only the even tracks or the odd tracks have 'end of the data' markers. In those cases the tape does not have to be positioned from the beginning of the tape to the end of the tape during the search. The difference in the number of tracks between 'end of the data' markers would in that case be equal to 2 providing all even or all odd tracks with 'end of data' markers.

Now referring to FIG. 7 which shows a schematic block diagram of the method and apparatus of data searching used in a computer system. The computer system 91 comprises substantially a computer or tape controller 80 which interfaces to a data searching mechanism 84 through a data register 81 which contains in one preferred embodiment in the invention a track number and three physical block bytes pbb1, pbb2 and pbb3. Those skilled in the art will recognize that the number of bits in each byte may vary and in this preferred embodiment the number of bits per byte is 8. In the preferred embodiment of the invention shown in FIG. 7 the computer tape controller specifies the data search mechanism which track the required block is on and the number of the physical block. The number of the physical blocks can be encoded in a number of ways familiar to those skilled in the art. The data search mechanism 84 of FIG. 7 utilizes the physical block search method found in FIG. 4.

Figure 8:
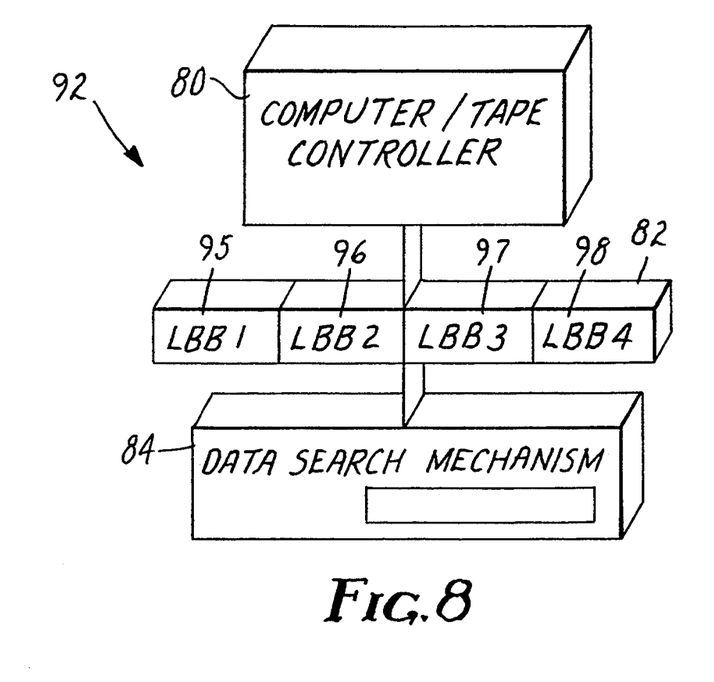
FIG. 8 is a schematic showing the method and apparatus of the invention used to determine a logical block address.

Now referring to FIG. 8 which shows a schematic block diagram of the method of the invention used to search data on a tape knowing the logical block address. FIG. 8 shows a computer or tape controller 80 interfaced to the data search mechanism 84 through logical block register 82. The logical block register is composed of four bytes of data logical block 1 (lbb1), logical block byte 2 ( lbb2 ), logical block byte 3 (lbb3) and logical block byte 4 (lbb4). Those skilled in the art will recognize that the number of bytes in the logical block will vary depending on the application and the number of anticipated logical blocks on the data tape. The data searching mechanism uses the information in the logical block register 82 to implement the algorithm disclosed in FIG. 5 where the logical block is used to determine a prediction of a track and the algorithm iterates until the track and logical block is found.

Figure 9:
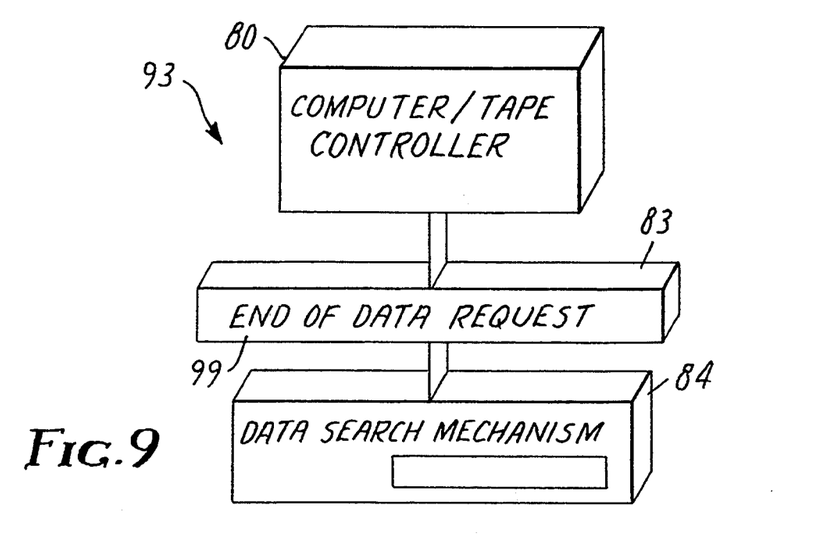
FIG. 9 shows a schematic of the method and apparatus of the invention used in a computer system to determine the end of data on a data tape.

Now referring to FIG. 9 which shows the data search algorithm method an apparatus of the invention for data cartridge systems utilize to find the end of the data on the serpentine tape 93. As described above he serpentine tape has written a end of the data marker in each physical block. The system comprises a computer tape controller 80 which interfaces to a data search mechanism 84 through a end of the data request register 83. The end of the data request register simply indicates to the data search mechanism 84 that the tape should be positioned to the end of the data. The data search mechanism implements the end of the data searching out a method and apparatus disclosed in FIG. 6. Those skilled in the art will recognize that the end of the data search mechanism and apparatus of the invention is independent of the number of serpentine tracks on the tape and implements a end of the data search method and apparatus that is suitable for use in high speed high density computing environments.

The invention has been described herein in considerable detail in order to comply with the Patent Statutes and to provide those skilled in the art with the information needed to apply the novel principle and to construct and use such specialized components as are required. However, it is to be understood that the invention can be carried out by specifically different equipment and devices, and that various modifications, both as to the equipment devices and operating procedures, can be accomplished without departing from the scope of the invention itself.

What is claimed is:

1. A method of locating the end of the data on a serpentine written tape having a plurality of tracks including a current track, target track, lowest track and a highest track, and a low track bound and a high track bound, and wherein each track comprises a track header and a plurality of physical blocks, wherein an end of the data signal is written to predetermined track headers that do not contain valid data and wherein an end of the data signal is written at the end of the last written physical block of data, and wherein the method comprises the steps of:

a. setting the difference in the number of tracks between end of data signals to be that number of tracks that exist between tracks with end of the data signals in their track headers plus one;
    b. setting the low bound to the lowest track;
    c. setting the high bound to the next higher power of two greater than or equal to the lowest track plus the difference between the highest and lowest track;
    d. setting the target track to an upper integer bound of the low track bound plus the difference between the high track bound and the low track bound divided by two;
    e. comparing the target track to the highest track and if the target track is greater than the highest track setting the current track to the highest track;
    f. positioning the tape to the beginning of the current track;
    g. checking for the end of the data signal at the beginning of the current track;
    h. checking if the difference between the high bound and low bound is less than or equal to the difference in the number of tracks between end of the data signals and if so checking if the end of data signal is at the beginning of the current track and if the end of data signal is at the beginning of the current track stepping to step k, if the end of the data signal is not at the beginning of the current track stepping to step 1;
    i. setting the low track bound to equal the target track if there is no end of the data signal at the beginning of the current track and setting the high track bound equal to the target track if there is an end of the data signal at the beginning of the current track;
    j. returning to step a
    k. setting the current track to the current track minus the difference in the number of tracks between end of the data signals;
    l. positioning the tape to the beginning of the current track; and
    m. scanning the tape until the end of the data signal is found.

2. The method of claim 1 wherein alternate tracks have 'end of data' markers in their headers.

3. The method of locating the end of the data on a tape of claim 1 wherein the tape is a cartridge tape.

4. The method of locating the end of the data on a tape of claim 1 wherein the tape physical blocks are constant length.

5. The method of locating the end of the data on a tape of claim 1 further comprising an end of the data request.

6. The method of claim 5 wherein the end of the data request is issued by a microprocessor.

* * * * *

UNITED STATES PATENT AND TRADEMARK OFFICE
CERTIFICATE OF CORRECTION

PATENT NO. : 5,373,485
DATED : December 13, 1994
INVENTOR(S) : Hogan et al.

It is certified that error appears in the above-indentified patent and that said Letters Patent is hereby corrected as shown below:

Col. 1, line 17, "3,692,225" should be --3,692,255--.

Col. 2, line 8, "referred" should be --preferred--.

Col. 2, line 20, "provide" should be --provided--.

Col. 5, line 32, "hat" should be --that--.

Col. 9, line 7, "an" should be --and--.

Col. 9, line 9, "he" should be --the--.

Signed and Sealed this

Fourth Day of April, 1995

Attest:

BRUCE LEHMAN

Attesting Officer     Commissioner of Patents and Trademarks